United States Patent [19]
Billström

[11] Patent Number: 5,838,670
[45] Date of Patent: Nov. 17, 1998

[54] POINT TO MULTIPOINT RADIO ACCESS SYSTEM

[75] Inventor: Jan-Olof V. Billström, Solna, Sweden

[73] Assignee: Telefonaktiebolaget L M Ericsson, Stockholm, Sweden

[21] Appl. No.: 790,477

[22] Filed: Jan. 29, 1997

[51] Int. Cl.$^6$ .................................................. H04J 3/16
[52] U.S. Cl. ........................................................ 370/328
[58] Field of Search ................................. 370/312, 315, 370/316, 328, 329, 335, 339, 343, 344, 480, 485, 499, 310, 337, 321, 347, 338, 276, 277; 455/422, 19, 13.3, 517, 524, 525

[56] References Cited

U.S. PATENT DOCUMENTS 4,813,036  3/1989  Whitehead .
5,649,287  7/1997  Forssen et al. ........................ 370/312

FOREIGN PATENT DOCUMENTS

| 0 201 254 A2 | 11/1986 | European Pat. Off. . |
| 0 429 200 A2 | 5/1991 | European Pat. Off. . |
| 0429200A2 | 5/1991 | European Pat. Off. ......... H04H 3/00 |
| 0715478A2 | 5/1996 | European Pat. Off. ......... H04Q 7/36 |
| 0 715 478 A2 | 6/1996 | European Pat. Off. . |
| 1 586 260 | 3/1981 | United Kingdom . |

*Primary Examiner*—Dang Ton
*Attorney, Agent, or Firm*—Nixon & Vanderhye, P.C.

[57] ABSTRACT

A robust and frequency-economic point to multipoint radio access microwave system combines the use of only two frequency bands and alternating polarizations. Base station antennae feeding adjacent sectors from a common base station site operate at least with different ones of two sets of channels. Moreover, sectors at adjacent base station sites (e.g., in adjacent cells) which are aligned with the sectors of the first base station site employ either a different set of channels or differing polarization. The two sets of channels can be two sets of frequencies (e.g., FDMA).

31 Claims, 5 Drawing Sheets

POINT TO MULTIPOINT RADIO ACCESS SYSTEM

BACKGROUND

1. Field of Invention

This invention pertains to a point to multipoint radio access system. The invention particularly pertains to the configuration of cells for such a system.

2. Related Art and Other Considerations

Radio access methods have become frequently used to enable the rapid and economic implementation of the access network in modern telecommunication networks. Most known solutions up to date are based on conventional mobile cellular techniques, where the subscribers are fixed instead of mobile. One disadvantage of using cellular techniques for the access network is that the radio spectrum is limited and the implication of this is that these systems normally have a too limited capacity, especially in cities.

Recently a new point to multi point system has been suggested that uses microwave links between a central base station and subscriber terminals. The central base station uses normally 45 or 90 degree sector antennas and the terminals directive antennas pointing towards the base station.

In the suggested system, frequency reuse can be very effective by the use of alternating vertical and horizontal polarizations for the links in adjacent sectors. Also, the line of sight radio links lends themselves to high quality connections, the capacity of which can be adapted individually to different capacities (bitrates).

A system of this kind is described in a paper entitled "Link Capacity and Cellular Planning Aspects of a Point to Point Fixed Radio Access System", by A. Bollmann, D. Chicon, and M. Glauner, European conference on Radio Relay Systems 1996, Bologna, Italy. However, the system therein described is, among other things, sensitive to depolarization effects, e.g., depolarization effects due to rain.

Depolarization concerns are briefly addressed in "Broadband wireless access systems at 28 Ghz", Douglas A. Gray, Communication Engineering & Design July 1996. Gray initially proposes, in a four sector cell of a relatively benign propagation environment, to alternate vertical and horizontal polarizations in the sectors of the cell. In such a cell, four times frequency reuse is achieved, i.e., the same frequencies can be used in each of the four sectors of the cell. For environments which are prone to polarization, Gray obliquely mentions that frequency diversity rather than polarization diversity is preferable. Thus, Gray would use four different frequencies rather than polarization techniques in a depolarization-prone cell.

Since there are a limited number of frequencies available, allocating a quarter of the available frequencies to a sector of a cell is contrary to frequency economy and limits the capacity of a cell.

What is needed therefor, and thus an object of the present invention, is a system which is both robust against interference and which affords frequency economy.

SUMMARY

A robust and frequency-economic point to multipoint radio access microwave system combines the use of only two frequency bands and alternating polarizations. Base station antennae feeding adjacent sectors from a common base station site operate at least with different ones of two sets of channels. Moreover, sectors at adjacent base station sites (e.g., in adjacent cells) which are aligned with the sectors of the first base station site employ either a different set of channels or differing polarization. The two sets of channels can be two sets of frequencies (as occurs, in FDMA [frequency division multiple access]).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
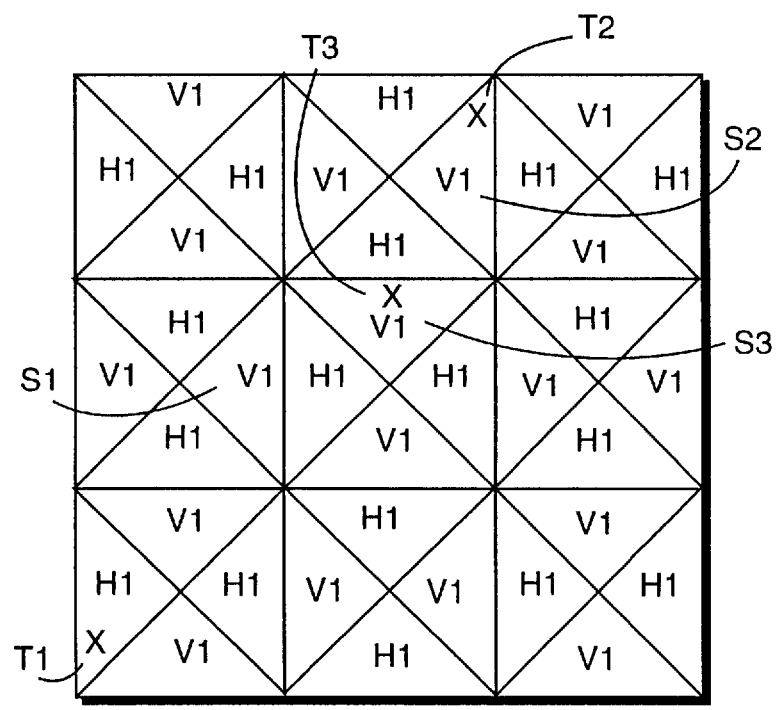
FIG. 1 is a schematic view of a prior art point to multipoint radio access system.

FIG. 1 shows basic cell structure of a four-sector, point to multipoint microwave system which operates in accordance with the prior art by employing discrimination only by polarization. FIG. 1 shows a regular pattern of square cells. At the center of each cell is a base station site. For each cell, four triangular sectors are indicated. Each sector is served an individual base station. Thus, there are four base station equipments (e.g., base station antennae) per base station site. Each of the four base stations equipments have approximately 90 degrees wide antennas which transmit to terminals in the coverage areas of their sectors. Between the sectors the polarizations of the base station antennae are shifted between vertical (V) and horizontal (H). The terminals in the sectors have much smaller antenna beamwidths, typically 4–8 degrees.

In FIG. 1, each sector is indicated as having transmissions that are either horizontally polarized (indicated by the capital letter "H") or vertically polarized (indicated by the capital letter "V"). All transmissions are in the same frequency band, for which reason a sector is labeled either as "H1" or "V1", the "1" indicating the same frequency band.

Several potential interference scenarios can arise with the prior art system of FIG. 1. Two exemplary scenarios are discussed below. As a first interference scenario, transmissions from terminal T1 could hit two base stations. Terminal T1 is located close to a boundary between two sectors served from the same site. If crosspolarization discrimination is weak, a wrong base station could receive transmissions from terminal T1. Depolarization effects, e.g., rain, especially at higher frequencies such as 18 or 26 Ghz, may deteriorate the crosspolarization between adjacent sectors, and thereby cause severe interference.

As a second potential interference scenario, note that transmissions from terminal T2 in a sector S2 could incorrectly hit the base station serving sector S1 and cause interference. A terminal such as terminal T2 can be aligned with two base stations so that no antenna discrimination between wanted and interfering signal would be obtained. In this scenario, the two sectors S1, S2 have the same polarization. As such, interference rejection will depend entirely on a higher attenuation of the interfering signal due to a longer traveled distance than for the wanted signal.

The present invention, representative embodiments of which are described below with respect to each of FIG. 2A, FIG. 2B, and FIG. 2C, achieves both a robust and frequency-economic system by combining the use of only two frequency bands and by alternating polarizations. Base station antennae feeding adjacent sectors from a common base station site operate at least with different ones of two sets of channels (e.g., frequency bands). Moreover, sectors at adjacent base station sites (e.g., in adjacent cells) which are aligned with the sectors of the first base station site employ either a different set of channels or polarization.

Figure 2A:
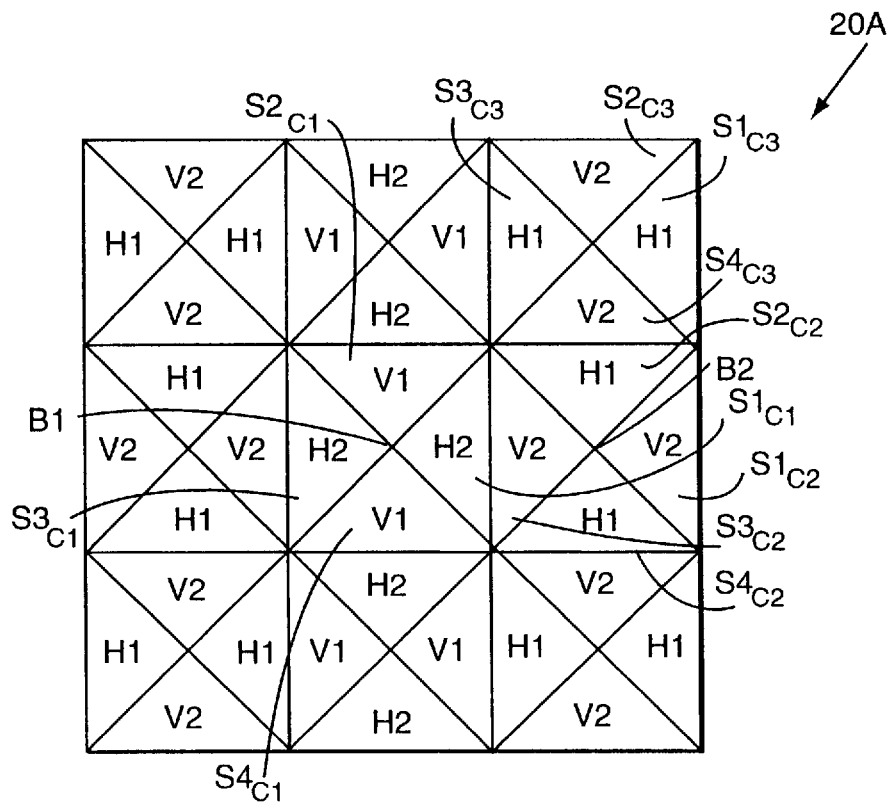
FIG. 2A is a schematic view of point to multipoint radio access system according to an embodiment of the invention.

FIG. 2A shows a point to multipoint microwave network 20A according to a first embodiment of the invention. Network 20A includes a regular pattern of base station sites and the corresponding cell or coverage area for each base station site. In FIG. 2A, the cell or coverage area for each base station site is shown as a square, with a base station site being located at the center of the square (i.e., the center of the cell). For example, base station site B1 is centrally located in its cell C1 and base station site B2 is centrally located in its cell C2.

In network 20A of FIG. 2A, each cell C comprises four triangular sectors. For example, cell C1 comprises sectors $S1_{C1}$, $S2_{C1}$, $S3_{C1}$, and $S4_{C1}$ and cell C2 comprises sectors $S1_{C2}$, $S2_{C2}$, $S3_{C2}$, and $S4_{C2}$.

Figure 3:
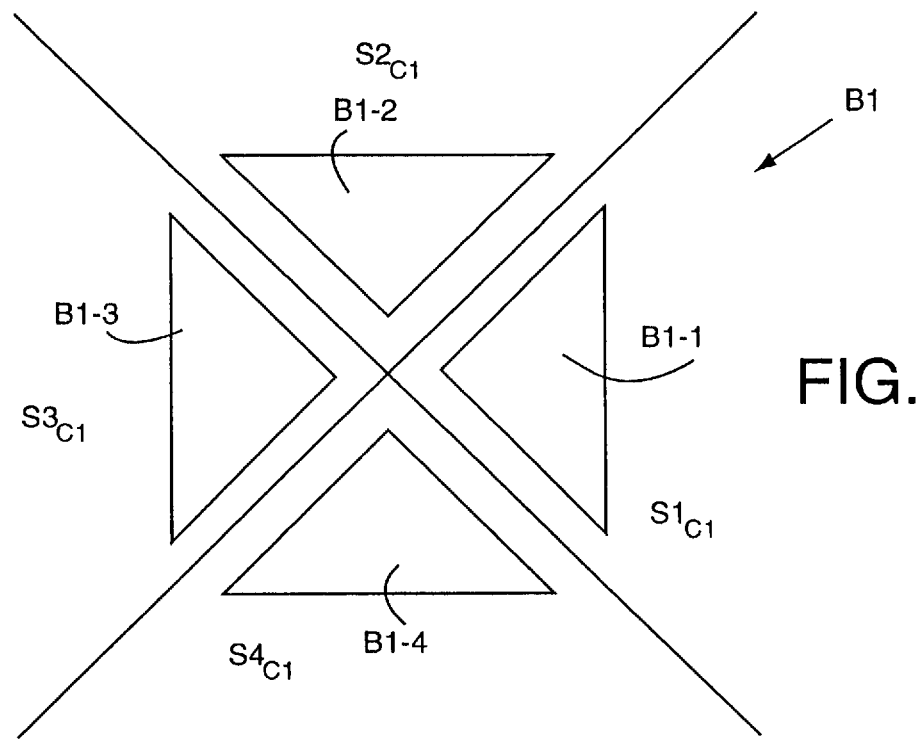
FIG. 3 is an enlarged schematic view of a portion of a coverage area served by a base station site of the network of FIG. 2A.

FIG. 3 shows an enlargement of the center of cell C1 served by base station site B1 of FIG. 2A. As seen in FIG. 3, each base station site, such as base station site B1, includes four base stations (base stations B1-1, B1-2, B1-3, and B1-4 being shown as included in base station site B1 in FIG. 3). In the particular configurations shown in FIG. 2A and FIG. 3, base stations at sites B1, B2 have approximately 90 degree wide antennas.

Although not illustrated, it should be understood that each sector has numerous terminals located therein. The terminals are located at premises of customers, with each terminal being connected by lines (e.g., POTS or ISDN lines) to many telephone subscribers. Each terminal is dedicated and adjusted to one base station. Terminals have much smaller antenna beamwidths, typically 4–8 degrees.

Although there are several terminals within each sector, for a given sector each terminal is allocated its individual frequency from a range of frequencies available in that sector. Whereas in FIG. 1 all sectors of a cell had the same range of frequencies, such is not the case in the embodiments of the present invention.

In the above regard, the microwave carrier utilized in the present invention has a band which is divided into two halves or two subbands, also known two ranges or two sets of channels. The nomenclature "two sets of channels" is intended to encompass numerous ways of dividing the microwave carrier. For example, the two sets of channels can be two sets of frequencies, as occurs, for example, in FDMA (frequency division multiple access).

In network 20A of FIG. 2A, two sets of frequencies are employed, a first set of frequencies and a second set of frequencies, which are respectively denoted by numerals "1" and "2" in the sector notations of the figures. As shown in FIG. 2A, base stations B1-1 has an antenna which transmits in the second set of frequencies and with horizontal polarization. Accordingly, sector $S1_{C1}$ is labeled "H2". Sector $S2_{C1}$, on the other hand, which is adjacent to sector $S1_{C1}$, has its base station B1-2 transmitting in the first set of frequencies and with vertical polarization. Such being the case, sector $S2_{C1}$ is labeled "V1".

In the embodiment of FIG. 2A, opposite (i.e., non-adjacent) sectors in the same cell have their base stations transmitting in the same set of frequencies and with the same polarization. Thus, sectors $S1_{C1}$, and $S3_{C1}$ are both labeled "H2"; sectors $S2_{C1}$ and $S4_{C1}$ are both labeled "V1". Moreover, it should be noted that in all cases sectors of neighboring cells have at least opposite polarizations (e.g., see sectors $S1_{C1}$ and $S3_{C2}$), and that in some cases sectors of neighboring cells have both opposite polarizations and differing sets of frequencies.

Thus, in FIG. 2A isolation between adjacent sectors with a common site is obtained by different frequencies and polarization. However, opposite sectors use again the same frequency and polarization so the system uses only two frequency bands. Isolation between opposite sectors is achieved by the antenna discrimination between the sectors, i.e., each base station antenna has in the 4-sector case basically a 90 degree wide antenna. In the immediate adjacent sector, the antenna gain starts to fall off, so that in the next adjacent sector the antenna gain is low enough to provide adequate isolation.

Between the sectors belonging to different sites and aligned in the same directions, it can be seen that isolation is achieved by polarization or frequency. In this case there is also isolation due to distance, i.e., the interference signal will travel a longer distance than the wanted signal. In this case it is not essential to achieve full polarization isolation as the propagation attenuation due to distance will add a substantial part. This favorably compares with the second interference scenario discussed above.

In the next outer ring of sites of network 20A of FIG. 2A, the same frequency/polarization relations are repeated as in the first cell (e.g., cell C1). Here distance isolation is adequate (the distance ratio between wanted and interfering base station to terminal at least 5 to 1).

Figure 2B:
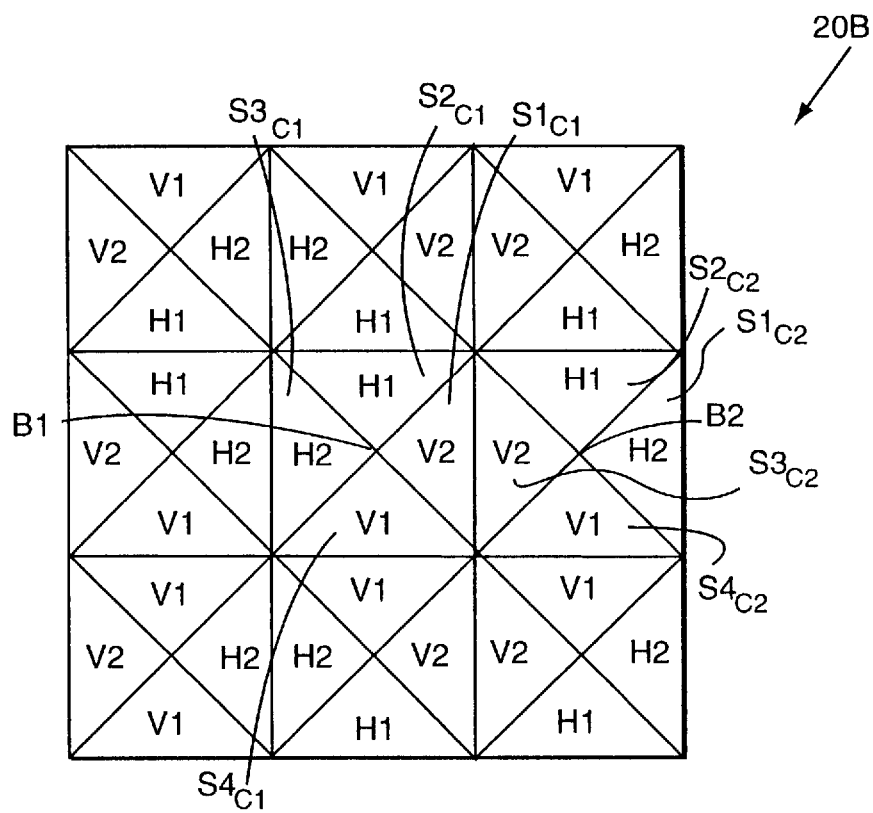
FIG. 2B is a schematic view of point to multipoint radio access system according to another embodiment of the invention.

FIG. 2B illustrates an embodiment of the invention, particularly network 20B wherein opposite sectors in the same cell have the same set of frequencies but differing polarizations. Whereas sector $S1_{C1}$ operates on the second set of frequencies and has vertical polarization, sector $S3_{C1}$ operates on the second set of frequencies but has horizontal polarization. Another way of viewing network 20B is recognizing that each cell has two sets of adjacent sectors, each set of adjacent sectors having the same polarization but operating in a different set or range of frequencies. For example, sector $S1_{C1}$ and sector $S4_{C1}$ have the same polarization (vertical), with sector $S1_{C1}$ operating in the second set of frequencies and sector $S4_{C1}$ operating in the first set of frequencies. Similarly, sector $S2_{C1}$ and sector $S3_{C1}$ have the same polarization (horizontal), with sector $S2_{C1}$ operating in the firstset of frequencies and sector $S3_{C1}$ operating in the second set of frequencies. Thus, in network 20B of FIG. 2B adjacent sectors at a common site are isolated at least by frequency and aligned sectors at adjacent base stations are isolated at least by polarization.

Preferences between network 20A of FIG. 2A and network 20B of FIG. 2B may depend on factors including operating environment. Network 20A of FIG. 2A is particularly handy if the original network were that of FIG. 1 (i.e., all sectors having the same set of channels) and an upgrade to a bifurcated channel range were desired in view of depolarization problems. A conversion from the network of FIG. 1 to network 20A of FIG. 2A merely involves a retuning of base station frequencies in accordance with the frequency range subdivision of FIG. 2A. On the other hand, network 20B of FIG. 2B better addresses problems of reflections between opposite sectors by e.g., providing polarization discrimination of the reflections.

The embodiments of the present invention also facilitate prudent inter-cell arrangements. Consider, for example, cell C1 and cell C3 in network 20B of FIG. 2A. As stated before, sectors $S1_{C1}$ and $S2_{C1}$ operate with different sets of frequencies. It is to be noted that, advantageously, sector $S2_{C3}$ (which is aligned to with the antenna of base station B1-2) has its base station operating at a different set of frequencies than base station B1-2 of sector $S2_{C1}$. In fact, it can be observed that, for networks 20A of FIG. 2A and 20B of FIG. 2B, aligned base station antenna in adjacent cells operate with at least one of differing polarization or different sets of frequencies.

Figure 2C:
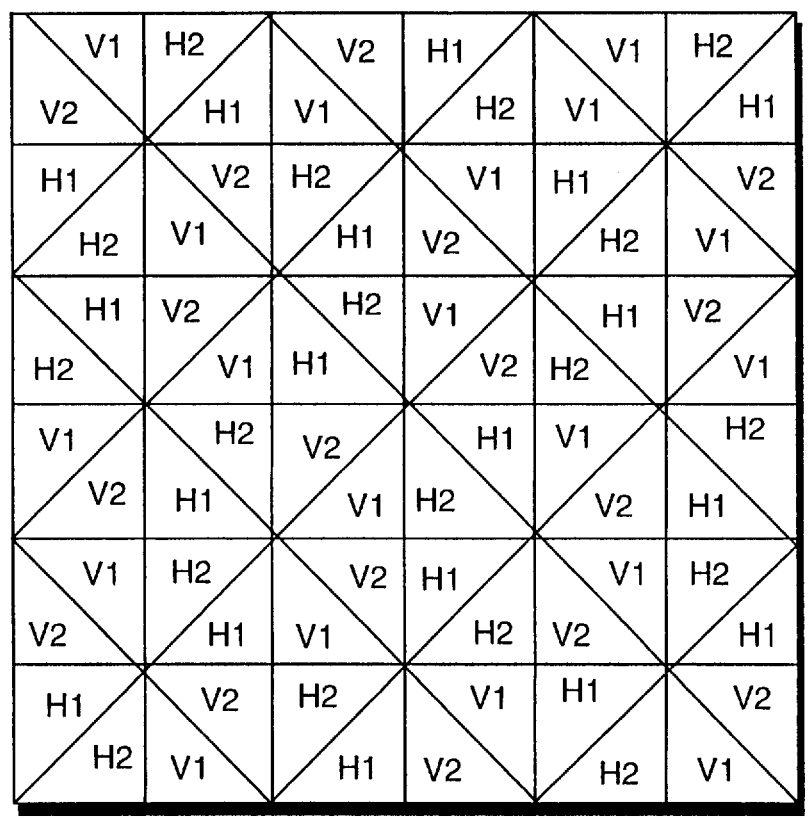
FIG. 2C is a schematic view of point to multipoint radio access system according to yet another embodiment of the invention.

FIG. 2C shows a network 20C having an eight-sector cell plan using the same principle. In network 20C, two adjacent sectors in the same cell have the same polarization but differing sets of frequencies.

Figure 4:
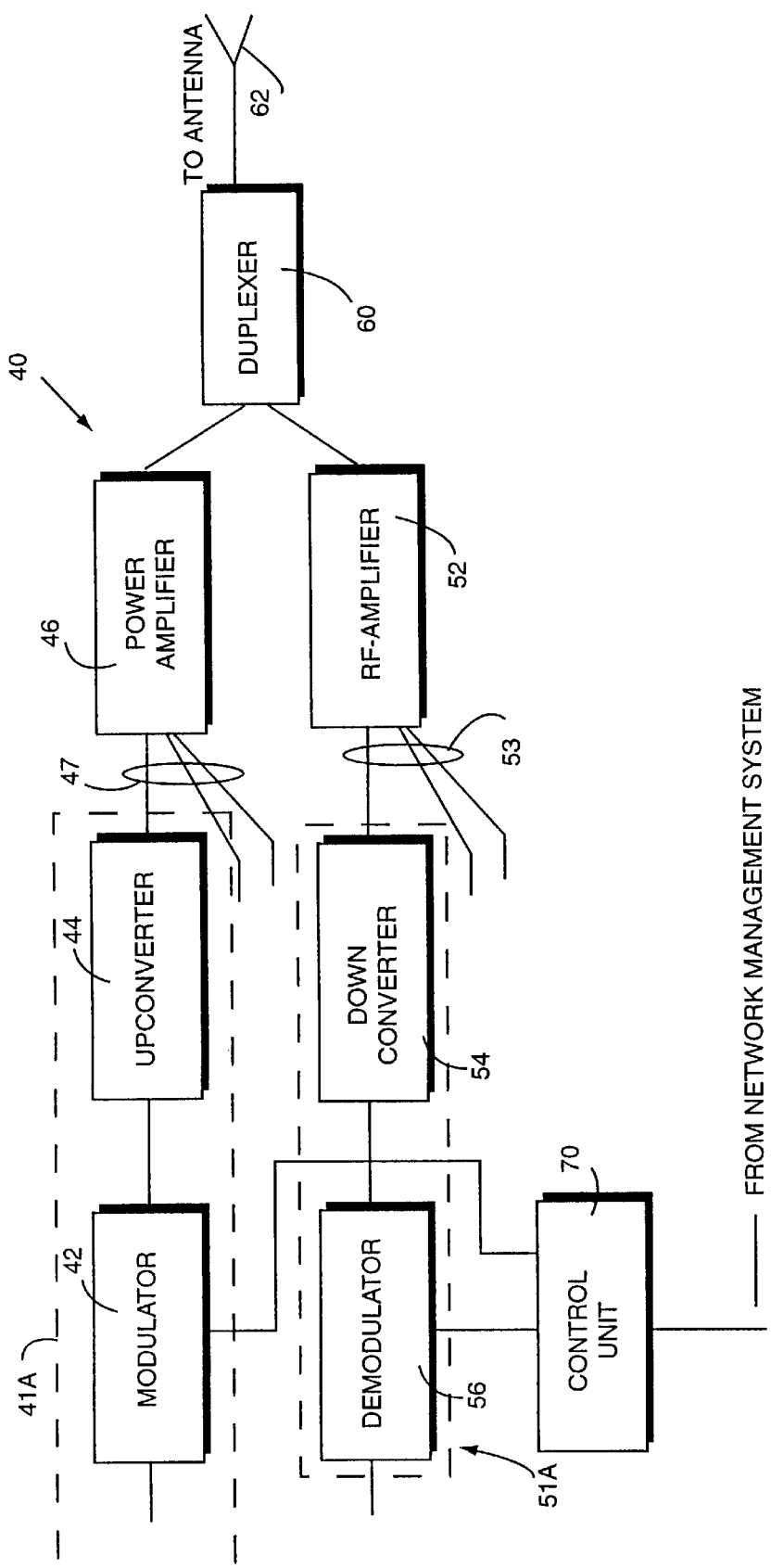
FIG. 4 is a schematic view of a base station according to an embodiment of the invention.

FIG. 4 shows a block diagram of a base station 40 (base station 40 being representative, for example, of base stations B1-1 through B1-4 discussed above). Base station 40 includes in its transmitter part a plurality of transmission channels 41, one such channel 41A being fully shown in FIG. 4. Each channel 41 has a modulator 42 and an upconverter 44 to convert the signals to RF-frequency. All transmission channels 41 are connected to power amplifier 46 as indicated by lines 47. Base station 40 also has a receiver part or receiver side having receiver channels 51, only channel 51A being fully illustrated in FIG. 2. All receiver channels 51 share a common RF-amplifier 52. Amplifier 52 is connected by lines 53 to each receiver channel 51. Each receiver channel 51 includes a down converter 54 and a demodulator 56. Duplexer 60 of base station 40 combines the transmitter and the receiver to a common antenna 62. The modulator 42 and demodulator 56 of each channel (commonly known as a modem) are controlled by a control unit 70. Control unit 70 connects to all transmission and receive channels. Control unit 70 sets the basic link parameters for the modem, i.e. modulation type, transmit power density, and bitrate. In a DBA (Dynamic Bandwidth Allocation) mode, control unit 70 also makes bandwidth allocations to the individual terminals on a momentary basis.

The present invention involves splitting a range of channels into to halves. One of the halves of channels are allocated to some sectors while the other of the halves of channels are allocated to other sectors. At the base stations, tuning to the appropriate half channel range and polarization are required. The person skilled in the art knows how to polarize antennae e.g., by antenna orientation. Likewise, transmissions of differing frequencies is adjustable by appropriate tuning of transmitters and receivers.

It should be understood that, for a given set of channels, discrimination between receivers can be performed by one or more conventional techniques, such as FDMA, different times slots on a sole carrier frequency, as occurs in TDMA (time division multiple access), or differing codes on a sole carrier frequency, as occurs in CDMA (code division multiple access).

While the invention has been particularly shown and described with reference to the preferred embodiments thereof, it will be understood by those skilled in the art that various alterations in form and detail may be made therein without departing from the spirit and scope of the invention. For example, although described in relation to a system with triangular sectors, the person skilled in the art could equally well apply the principles of the invention to a system employing sectors that are formed as squares. Moreover, the invention is equally applicable to broadband access systems in which there is normally different demands on bandwidth on the downlink and the uplink. The invention could, however, be applied to both links.

The present invention provides a cell plan, radio access system, and method of operating the same which, when compared with that of FIG. 1, has increased robustness against deterioration caused by depolarization. While it would initially appear that the number of frequencies available for a sector are halved by the present invention, such is not quite the case. In the prior art, it may have been necessary to reserve certain frequencies for problem terminals in a given sector. Such frequency reservation for problems sectors is obviated by the present invention, so that frequency availability decrease in some implementations is less than a factor of two.

The embodiments of the invention in which an exclusive property or privilege is claimed are defined as follows:

1. A radio access system comprising at least a first cell and a second cell, the first cell having at least four base station antennae, each of the four base station antennae transmitting a microwave carrier to one of a corresponding at least four sectors of the first cell, a band of the microwave carrier being divided into at least a first set of channels and a second set of channels, wherein a first base station antenna serving a first sector of the first cell transmits on the first set of channels and a second base station antenna serving a second sector of the first cell adjacent the first sector transmits on the second set of channels, and wherein at least two of the base station antennae of the first cell have differing polarizations;

the second cell being adjacent to the first cell, and wherein a second cell base station antenna transmits either on a different one of the separate sets of channels or with a different polarization than any first cell base station antenna with which it is aligned.

2. The system of claim 1, wherein the first base station antenna of the first cell and the second base station antenna of the first cell have differing polarization.

3. The system of claim 2, wherein a base station antenna serving a third sector of the first cell transmits on the first set of channels and has a same polarization as the base station antenna serving the first sector of the first cell, the third sector of the first cell being opposite and non-adjacent the first sector of the first cell.

4. A radio access system comprising at least a first cell, the first cell having at least four base station antennae, each of the four base station antennae transmitting a microwave carrier to one of a corresponding at least four sectors of the first cell, a band of the microwave carrier being divided into at least a first set of channels and a second set of channels, wherein a first base station antenna serving a first sector transmits on the first set of channels and a second base station antenna serving a second sector adjacent the first sector transmits on the second set of channels, wherein at least two of the base station antennae of the first cell have differing polarizations, and wherein the first base station antenna and the second base station antenna have a same polarization.

5. The system of claim 4, wherein a third base station antenna serving a third sector transmits on the first set of channels and has a different polarization than the first base station antenna, the third sector being opposite and non-adjacent the first sector.

6. The system of claim 5, wherein the system comprises a second cell which includes a second cell sector served by a second cell base station antenna, the second cell sector being adjacent the first sector of the first cell, the second cell base station antenna transmitting on the first set of channels and having a same polarization as the first base station antenna.

7. The system of claim 5, wherein the system comprises four bordering cells which are adjacent to the first cell, and wherein a sector in any of the four bordering cells which is adjacent to an adjoining sector of the first cell is served by a bordering cell antenna, the bordering cell antenna using a same set of channels and a same polarization as the base station antenna which serves the adjoining sector of the first cell.

8. The system of claim 1, wherein the first set of channels is a first set of frequencies and the second set of channels is a second set of frequencies.

9. The system of claim 1, wherein the second cell base station antenna transmits on a different one of the separate sets of channels than any first cell base station antenna with which it is aligned.

10. The system of claim 1, wherein the separate sets of channels comprise a first set of frequencies and a second set of frequencies.

11. The system of claim 1, wherein the base station antenna of the first sector of the first cell and the base station antenna of the second sector of the first cell have a same polarization.

12. The system of claim 11, wherein a base station antenna serving a third sector of the first cell transmits on the first set of channels and has a different polarization than the base station antenna serving the first sector of the first cell, the third sector of the first cell being opposite and non-adjacent the first sector of the first cell.

13. The system of claim 12, wherein the second cell which includes a second cell sector served by a second cell base station antenna, the second cell sector being adjacent the first sector of the first cell, the second cell base station antenna transmitting on the first set of channels and having a same polarization as the base station antenna of the first sector of the first cell.

14. The system of claim 13, wherein the system comprises four bordering cells which are adjacent to the first cell, and wherein a sector in any of the four bordering cells which is adjacent to an adjoining sector of the first cell is served by a bordering cell antenna, the bordering cell antenna using a same set of channels and a same polarization as the base station antenna which serves the adjoining sector of the first cell.

15. A method of operating a radio access system, the method comprising:

in each of a first cell and a second cell, using at least four base station antennae to transmit a microwave carrier to a corresponding at least four sectors of each cell;

dividing a band of the microwave carrier into at least a first set of channels and a second set of channels;

transmitting on the first set of channels from a base station antennae which serves a first sector of the first cell;

transmitting on the second set of channels from a base station antennae which serves a second sector of the first cell, the second sector of the first cell being adjacent the first sector of the first cell;

transmitting from a base station antenna which serves a first sector of the second cell either (1) on the second set of channels, or (2) with a differing polarization than the base station serving the first sector of the first cell;

the first sector of the second cell being aligned with the first sector of the first cell.

16. The method of claim 15, wherein the first set of channels is mutually exclusive from the second set of channels.

17. The method of claim 15, wherein the base station antenna of the first sector of the first cell and the second base station antenna of the first sector of the first cell have differing polarization.

18. The system of claim 17, further comprising:

transmitting on the first set of channels from a base station antenna serving a third sector of the first cell, the base station antenna serving the third sector of the first cell having a same polarization as the base station antenna serving the first sector of the first cell, the third sector of the first cell being opposite and non-adjacent the first sector of the first cell.

19. The method of claim 15, wherein the base station antenna of the first sector of the first cell and the base station antenna of the second sector of the first cell have a same polarization.

20. The system of claim 19, transmitting on the first set of channels from a base station antenna serving a third sector of the first cell, the base station antenna serving the third sector of the first cell having a different polarization than the base station antenna serving the first sector of the first cell, the third sector of the first cell being opposite and non-adjacent the first sector of the first cell.

21. The system of claim 20, further comprising:

serving a second cell which includes a second cell sector with a second cell base station antenna, the second cell sector being adjacent the first sector of the first cell;

transmitting from the second cell base station antenna on the first set of channels and with a same polarization as the base station antenna serving the first sector of the first cell.

22. A method of operating a radio access system, the method comprising:

using at least four base station antennae to transmit a microwave carrier to a corresponding at least four sectors of a cell;

dividing a band of the microwave carrier into at least a first set of channels and a second set of channels;

transmitting on the first set of channels from the a first of the base station antennae which serves a first sector;

transmitting on the second set of channels from the a second of the base station antennae which serves a second sector, the second sector being adjacent the first sector;

operating at least two of the base station antennae to have differing polarizations;

wherein the first base station antenna and the second base station antenna have a same polarization.

23. The system of claim 22, transmitting on the first set of channels from a third base station antenna serving a third sector, the third base station antenna having a different polarization than the first base station antenna, the third sector being opposite and non-adjacent the first sector.

24. The system of claim 23, further comprising:
serving a second cell which includes a second cell sector with a second cell base station antenna, the second cell sector being adjacent the first sector of the first cell;
transmitting from the second cell base station antenna on the first set of channels and with a same polarization as the first base station antenna.

25. The method of claim 15, wherein the first set of channels is a first set of frequencies and the second set of channels is a second set of frequencies.

26. A radio access system comprising at least a first cell and a second cell, the first cell and the second cell each having at least four base station antennae, each of the four base station antennae transmitting a microwave carrier to one of a corresponding at least four sectors of the first cell, a band of the microwave carrier being divided into at least a first set of channels and a second set of channels, wherein a base station antenna serving a first sector of the first cell transmits on the first set of channels and a base station antenna serving a second sector of the first cell adjacent the first sector of the first cell transmits on the second set of channels, wherein a first sector of the second cell is aligned with the first sector of the first cell, wherein the base station antenna serving the first sector of the second cell transmits in accordance with at least one of the following: (1) on the second set of channels; (2) with a differing polarization than the base station antenna serving the first sector of the first cell.

27. The system of claim 26, wherein the base station antenna of the first sector of the first cell and the second base station antenna of the first cell have differing polarization.

28. The system of claim 27, wherein a base station antenna serving a third sector of the first cell transmits on the first set of channels and has a same polarization as the base station antenna of the first sector of the first cell, the third sector of the first cell being opposite and non-adjacent the first sector of the first cell.

29. The system of claim 26, wherein the base station antenna of the first sector of the first cell and the base station antenna of the second sector of the first cell have a same polarization.

30. The system of claim 29, wherein a base station antenna serving a third sector of the first cell transmits on the first set of channels and has a different polarization than the base station antenna of the first sector of the first cell, the third sector of the first cell being opposite and non-adjacent the first sector of the first cell.

31. The system of claim 26, wherein the first set of channels is a first set of frequencies and the second set of channels is a second set of frequencies.

* * * * *